US012801310B2

(12) United States Patent
Lai et al.

(10) Patent No.: US 12,801,310 B2
(45) Date of Patent: Nov. 17, 2026

(54) DYNAMIC ERASE VOLTAGE STEP

(71) Applicant: Micron Technology, Inc., Boise, ID (US)

(72) Inventors: Jiun-Horng Lai, Kanagawa-ken (JP); Pitamber Shukla, Boise, ID (US); Ching-Huang Lu, Fremont, CA (US); Chengkuan Yin, Tokyo (JP); Ronit Roneel Prakash, Hiratsuka City (JP); Yoshiaki Fukuzumi, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 232 days.

(21) Appl. No.: 18/443,584

(22) Filed: Feb. 16, 2024

(65) Prior Publication Data

US 2024/0281148 A1 Aug. 22, 2024

Related U.S. Application Data

(60) Provisional application No. 63/446,687, filed on Feb. 17, 2023.

(51) Int. Cl.
*G11C 29/52* (2006.01)
*G06F 3/06* (2006.01)

(52) U.S. Cl.
CPC .................................. *G06F 3/0659* (2013.01)

(58) Field of Classification Search
CPC ...................................................... G11C 16/14
See application file for complete search history.

(56) References Cited

U.S. PATENT DOCUMENTS

| | | | | |
|---|---|---|---|---|
| 7,400,537 B2 * | 7/2008 | Hemink | G11C 16/3477 | 365/185.29 |
| 8,605,508 B2 | 12/2013 | Itagaki | | |
| 9,343,171 B1 * | 5/2016 | Sun | G11C 11/5635 | |
| 9,881,685 B2 | 1/2018 | Yoon | | |
| 10,340,017 B2 * | 7/2019 | Ku | G11C 16/0483 | |
| 11,830,559 B2 | 11/2023 | Shibata | | |
| 2008/0165585 A1 * | 7/2008 | Surico | G11C 16/344 | 365/185.22 |
| 2009/0251971 A1 * | 10/2009 | Futatsuyama | G11C 16/344 | 365/185.18 |
| 2010/0039864 A1 * | 2/2010 | Sarin | G11C 16/344 | 365/230.03 |
| 2010/0277983 A1 * | 11/2010 | Mokhlesi | G11C 16/16 | 365/185.17 |

(Continued)

*Primary Examiner* — Douglas King
(74) *Attorney, Agent, or Firm* — Brooks, Cameron & Huebsch, PLLC

(57) ABSTRACT

Apparatuses, systems, and methods for determining a dynamic erase voltage step. One example apparatus can include an array of memory cells and a controller coupled to the array of memory cells, wherein the controller is configured to apply a first erase voltage to a first wordline and a second wordline in the array of memory cells to perform an erase operation, apply a first verify voltage to the first wordline to verify the erase operation, apply a second verify voltage greater than the first verify voltage to the second wordline in response to failing to verify the erase operation by applying the first verify voltage to the first wordline, and apply a second erase voltage to the first wordline and the second wordline in response to verifying the erase operation by applying the second verify voltage to the second wordline.

15 Claims, 8 Drawing Sheets

(56) References Cited

U.S. PATENT DOCUMENTS

| | | | | |
|---|---|---|---|---|
| 2012/0206975 | A1* | 8/2012 | Yang | G11C 11/5635 365/185.22 |
| 2016/0049199 | A1* | 2/2016 | Nishikawa | G11C 16/14 365/185.12 |
| 2017/0372789 | A1* | 12/2017 | Ray | G11C 16/0483 |
| 2018/0068740 | A1* | 3/2018 | Lee | G11C 16/3445 |
| 2019/0051362 | A1* | 2/2019 | Lee | G11C 16/14 |
| 2019/0122741 | A1* | 4/2019 | Cheng | G11C 16/3495 |
| 2019/0180832 | A1* | 6/2019 | Rori | G11C 16/16 |
| 2024/0112742 | A1* | 4/2024 | Huang | G11C 16/3445 |

* cited by examiner

DYNAMIC ERASE VOLTAGE STEP

PRIORITY INFORMATION

This application claims the benefits of U.S. Provisional Application No. 63/446,687, filed on Feb. 17, 2023, the contents of which are incorporated herein by reference.

TECHNICAL FIELD

The present disclosure relates generally to memory devices, and more particularly, to apparatuses, methods, and systems for determining and applying a dynamic erase voltage step.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory, e.g., NAND flash memory and/or NOR flash memory, and/or can include volatile memory, e.g., DRAM and/or SRAM, among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Memory is utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory cells in an array architecture can be programmed to a desired state. For instance, electric charge can be placed on or removed from the charge storage structure, e.g., floating gate, of a memory cell to program the cell to a particular state. For example, a single level (memory) cell (SLC) can be programmed to one of two different states, each representing a different digit of a data value, e.g., a 1 or 0. Some flash memory cells can be programmed to one of more than two states corresponding to different particular data values, e.g., 1111, 0111, 0011, 1011, 1001, 0001, 0101, 1101, 1100, 0100, 0000, 1000, 1010, 0010, 0110, or 1110. Such cells may be referred to as multi state memory cells, multiunit cells, or multilevel (memory) cells (MLCs). MLCs can provide higher density memories without increasing the number of memory cells since each cell can be programmed to states corresponding to more than one digit, e.g., more than one bit of data.

DETAILED DESCRIPTION

Figure 1:
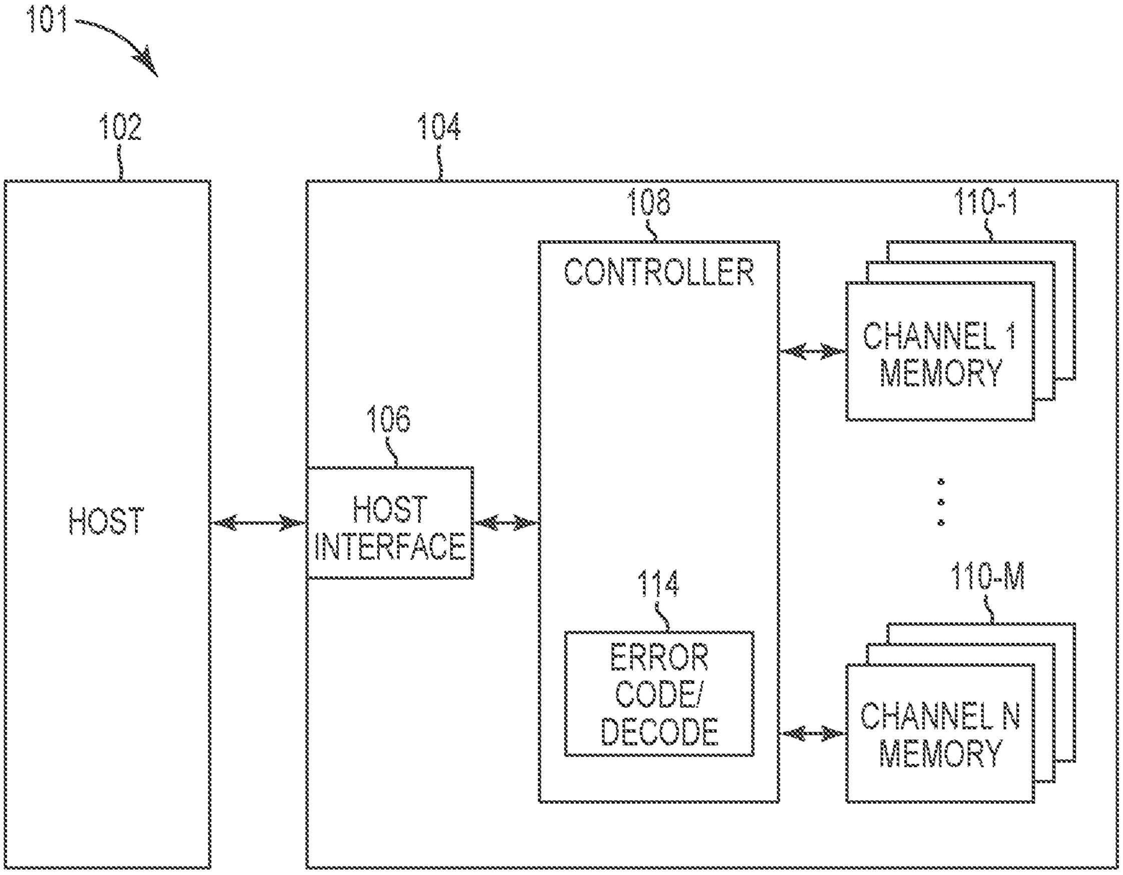
FIG. 1 is a block diagram of an apparatus in the form of a computing system including at least one memory system in accordance with some embodiments of the present disclosure.

Apparatuses, systems, and methods for determining a dynamic erase voltage step are provided herein. In a number of embodiments of the present disclosure, an apparatus can include an array of memory cells and a controller coupled to the array of memory cells, wherein the controller is configured to apply a first erase voltage to a first wordline and a second wordline in the array of memory cells to perform an erase operation, apply a first verify voltage to the first wordline to verify the erase operation, apply a second verify voltage greater than the first verify voltage to the second wordline in response to failing to verify the erase operation by applying the first verify voltage to the first wordline, and apply a second erase voltage to the first wordline and the second wordline in response to verifying the erase operation by applying the second verify voltage to the second wordline.

Precise erase voltage control is critical for cell reliability of 3D-Nand flash products. For example, erase depth variation can lead to intrinsic NAND cell reliability risks such as lateral charge loss. Gate-Induce-Drain-Leakage (GIDL) erase can require longer erase time, as such, a larger erase voltage step can be used to reduce erase loop counts and/or erase time. A larger erase voltage step can be greater than 250 mV, for example. The fewer erase loops, the higher erase performance specification. However, the larger the erase voltage step, the higher over-erase risk, which can degrade the intrinsic NAND cell reliability post higher endurance program erase cycling.

In a number of embodiments of the present disclosure, an erase voltage can be dynamically determined to reduce the risk of intrinsic cell reliability post cycling. Accordingly, the erase voltage step can be determined to accommodate block to block variation and achieve a high erase performance without compromising on intrinsic NAND cell reliability. For example, embodiments of the present disclosure can have improved block-to-block erase depth variation, NAND cell reliability, and erase performance than existing erase schemes.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more of such things. For example, a number of dampers can refer to one or more dampers. Additionally, designators such as "M", "N", and "P", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 101 including at least one memory system 104 in accordance with a number of embodiments of the present disclosure. As used herein, a memory system 104, a controller 108, or a memory device 110 might also be separately considered an "apparatus". The memory system 104 can be a solid state drive (SSD), for instance, and can include a host interface 106, a controller 108, e.g., a processor and/or other control circuitry, and a number of memory devices 110-1, . . . , 510-M, e.g., solid state memory devices such as NAND flash devices, which provide a storage volume for the memory system 104. In a number of embodiments, the controller 108, a memory device 110-1 to 110-M, and/or the host interface 106 can be physically located on a single die or within a single package, e.g., a managed NAND application. Also, in a number of embodiments, a memory, e.g., memory devices 110-1 to 110-M, can include a single memory device.

As illustrated in FIG. 1, the controller 108 can be coupled to the host interface 106 and to the memory devices 110-1, . . . , 110-M via a plurality of channels and can be used to transfer data between the memory system 104 and a host 102. The host interface 106 can be in the form of a standardized interface. For example, when the memory system 104 is used for data storage in a computing system 100, the host interface 106 can be a serial advanced technology attachment (SATA), peripheral component interconnect express (PCIe), or a universal serial bus (USB), among other connectors and interfaces. In general, however, host interface 106 can provide an interface for passing control, address, data, and other signals between the memory system 104 and a host 102 having compatible receptors for the host interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices, e.g., a number of processors.

The controller 108 can communicate with the memory devices 110-1, . . . , 110-M to control data read, write, and erase operations, among other operations. The controller 108 can include, for example, a number of components in the form of hardware and/or firmware, e.g., one or more integrated circuits, and/or software for controlling access to the number of memory devices 110-1, . . . , 110-M and/or for facilitating data transfer between the host 102 and memory devices 110-1, . . . , 110-M. For instance, in the example illustrated in FIG. 1, the controller 108 includes an error correcting code encoder/decode component 114. However, the controller 108 can include various other components not illustrated so as not to obscure embodiments of the present disclosure. Also, the component 114 may not be components of controller 108, in some embodiments, e.g., component 114 can be independent components.

The error correcting code encoder/decode component 114 can be an LDPC encoder/decoder, for instance, which can encode/decode user data transferred between host 102 and the memory devices 110-1, . . . , 110-M.

The memory devices 110-1, . . . , 110-M can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

Figure 2:
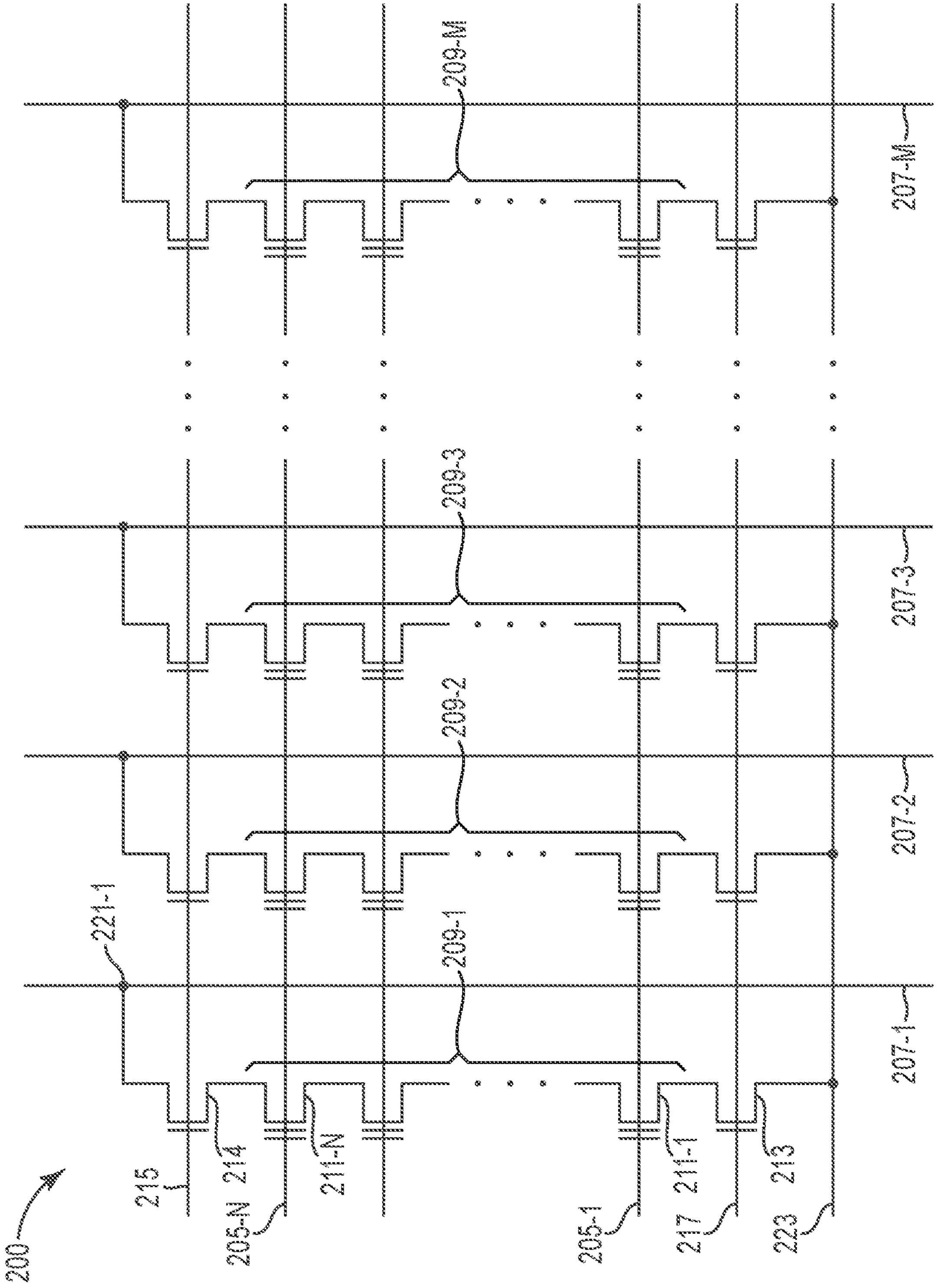
FIG. 2 illustrates a schematic diagram of a portion of a non-volatile memory array in accordance with a number of embodiments of the present disclosure.

FIG. 2 illustrates a schematic diagram of a portion of a non-volatile memory array 200 in accordance with a number of embodiments of the present disclosure. The embodiment of FIG. 2 illustrates a NAND architecture non-volatile memory array, e.g., NAND Flash. However, embodiments described herein are not limited to this example. As shown in FIG. 2, memory array 200 includes access lines, e.g., wordlines 205-1, . . . , 205-N, and intersecting data lines, e.g., local bit lines, 207-1, 207-2, 207-3, . . . , 207-M. For ease of addressing in the digital environment, the number of wordlines 205-1, . . . , 205-N and the number of local bit lines 207-1, 207-2, 207-3, . . . , 207-M can be some power of two, e.g., 256 word lines by 4,096 bit lines.

Memory array 200 includes NAND strings 209-1, 209-2, 209-3, . . . , 209-M. Each NAND string includes non-volatile memory cells 211-1, . . . , 211-N, each communicatively coupled to a respective wordline 205-1, . . . , 205-N. Each NAND string (and its constituent memory cells) is also associated with a local bit line 207-1, 207-2, 207-3, . . . , 207-M. The non-volatile memory cells 211-1, . . . , 211-N of each NAND string 209-1, 209-2, 209-3, . . . , 209-M are connected in series source to drain between a source select gate (SGS), e.g., a field-effect transistor (FET), 213, and a drain select gate (SGD), e.g., FET, 214. Each source select gate 213 is configured to selectively couple a respective NAND string to a common source 223 responsive to a signal on source select line 217, while each drain select gate 214 is configured to selectively couple a respective NAND string to a respective bit line responsive to a signal on drain select line 215.

As shown in the embodiment illustrated in FIG. 2, a source of source select gate 213 is connected to a common source line 223. The drain of source select gate 213 is connected to the source of the memory cell 211-1 of the corresponding NAND string 209-1. The drain of drain select gate 214 is connected to bit line 207-1 of the corresponding NAND string 209-1 at drain contact 221-1. The source of drain select gate 214 is connected to the drain of the last memory cell 211-N, e.g., a floating-gate transistor, of the corresponding NAND string 209-1.

In a number of embodiments, construction of non-volatile memory cells 211-1, . . . , 211-N includes a source, a drain, a charge storage structure such as a floating gate, and a control gate. Non-volatile memory cells 211-1, . . . , 211-N have their control gates coupled to a wordline, 205-1, . . . , 205-N respectively. A "column" of the non-volatile memory cells, 211-1, . . . , 211-N, make up the NAND strings 209-1, 209-2, 209-3, . . . , 209-M, and are coupled to a given local bit line 207-1, 207-2, 207-3, . . . , 207-M, respectively. A "row" of the non-volatile memory cells are those memory cells commonly coupled to a given wordline 205-1, . . . , 205-N. The use of the terms "column" and "row" is not meant to imply a particular linear, e.g., vertical and/or horizontal, orientation of the non-volatile memory cells. A NOR array architecture would be similarly laid out, except that the string of memory cells would be coupled in parallel between the select gates.

Subsets of cells coupled to a selected wordline, e.g., 205-1, . . . , 205-N, can be programmed and/or read together as a page of memory cells. A programming operation, e.g., a write operation, can include applying a number of program pulses, e.g., 16V-20V, to a selected word line in order to increase the threshold voltage (Vt) of selected cells coupled to that selected access line to a desired program voltage level corresponding to a target, e.g., desired, state, e.g., charge storage state. State is equivalently referred to as "level" herein.

A read operation, which can also refer to a program verify operation, can include sensing a voltage and/or current change of a bit line coupled to a selected cell in order to determine the state of the selected cell. The states of a particular fractional bit memory cell may not correspond directly to a data value of the particular memory cell, rather the states of a group of memory cells including the particular memory cell together map to a data value having an integer number of bits. The read operation can include pre-charging a bit line and detecting the discharge when a selected cell begins to conduct.

Determining, e.g., detecting, the state of a selected cell can include providing a number of sensing signals, e.g., read voltages, to a selected word line while providing a number of voltages, e.g., read pass voltages, to the word lines coupled to the unselected cells of the string sufficient to place the unselected cells in a conducting state independent of the threshold voltage of the unselected cells. The bit line corresponding to the selected cell being read and/or verified can be detected to determine whether or not the selected cell conducts in response to the particular sensing signal applied to the selected word line. For example, the state of a selected cell can be determined by the word line voltage at which the bit line current reaches a particular reference current associated with a particular state.

MLCs can be two-bit, e.g., four-state, memory cells, or store more than two bits of data per memory cell, including fractional bits of data per memory cell. For example, a two-bit memory cell can be programmed to one of four states, e.g., P0, P1, P2, and P3, respectively. In operation, a number of memory cells, such as in a selected block, can be programmed such that they have a Vt level corresponding to either P0, P1, P2, or P3. As an example, state P0 can represent a stored data value such as binary "11". State P1 can represent a stored data value such as binary "10". State P2 can represent a stored data value such as binary "00". State P3 can represent a stored data value such as binary "01". However, embodiments are not limited to these data value correspondence.

Figure 3A:
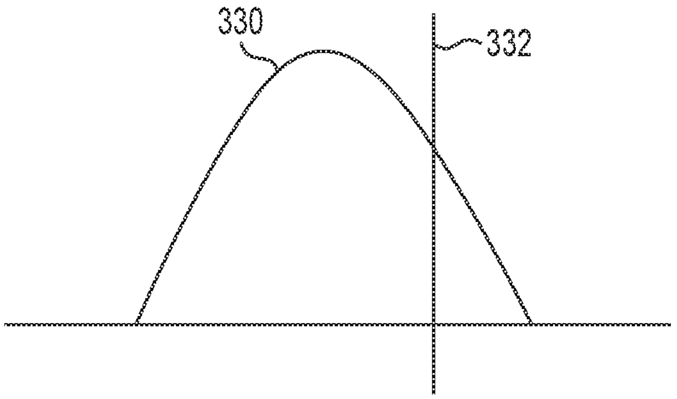
FIGS. 3A-3B are graphs of a threshold voltage distribution of an erased cell in accordance with a number of embodiments of the present disclosure.
Figure 3B:
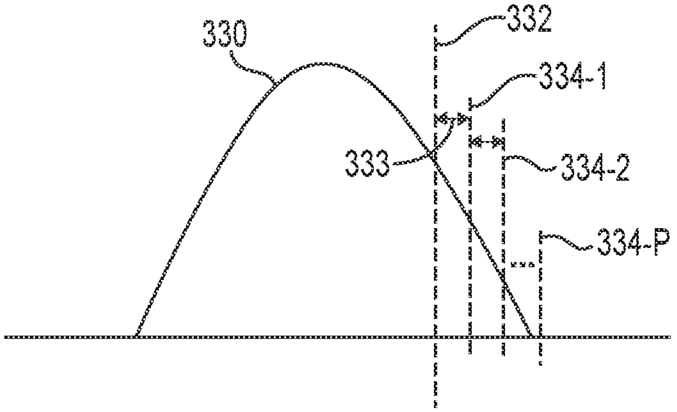

FIGS. 3A-3B are graphs of a threshold voltage distribution 330 of an erased cell in accordance with a number of embodiments of the present disclosure. The x-axis can be a voltage threshold and the y-axis can be a bit count. Failing bits can be bits that have a threshold voltage higher than a first verify voltage 332.

After a first erase voltage is applied to a first wordline and a second wordline in an array of memory cells to perform an erase operation, the first verify voltage 332 can be applied to the first wordline to verify the erase operation. An erase operation can be verified if a failing bit count from applying the first verify voltage 332 is zero.

If the erase operation fails to be verified by applying the first verify voltage 332 to the first wordline, a second verify voltage 334-1 can be applied to the second wordline, as illustrated in FIG. 3B. The second verify voltage 334-1 can be greater than the first verify voltage 332. In some examples, the first wordline can be an even wordline and the second wordline can be an odd wordline or the first wordline can be an odd wordline and the second wordline can be an even wordline. Even and odd wordlines can have the same threshold voltage distribution 330 post erase, accordingly, verify voltages applied to either wordlines can be shown on the same threshold voltage distribution 330 of an erased cell.

A second erase voltage can be applied to the first wordline and the second wordline in response to verifying the erase operation by applying the second verify voltage 334-1 to the second wordline. The second erase voltage can equal a sum of the first erase voltage and a verify voltage increment value 333 when the erase operation is verified by applying the second verify voltage 334-1 to the second wordline. For example, if the first erase voltage is 17 volts and the erase operation is verified by applying the second verify voltage 334-1 to the second wordline while the verify voltage increment value 333 is 0.2 volts, the second erase voltage is 17.2 volts.

Once the second erase voltage is applied, the first verify voltage can be reapplied to even wordlines, for example the first wordline. If the second erase voltage is verified by applying the first verify voltage 332 to the first wordline, the first verify voltage 332 can be applied to the second wordline, which can be an odd wordline. If the first verify voltage 332 applied to the first wordline fails to verify the erase operation, the second erase verify voltage 334-1 and/or other erase verify voltages 334-2, . . . , 334-P can be reapplied to the second wordline and/or other odd wordlines until the erase operation is verified. The second erase verify voltage 334-1 and/or the other erase verify voltages 334-2, . . . ,

334-P can be greater than the first erase verify voltage 332 and can increase until the erase operation is verified. The second erase verify voltage 334-1 can be the first verify voltage 332 plus a verify voltage increment value 333, for example. If the erase operation after the second erase voltage is applied is verified by applying the first verify voltage 332 to the second wordline, the erase operation can be complete.

If applying the second verify voltage 334-1 to the second wordline fails to verify the erase operation after the first erase voltage is applied, a third verify voltage 334-2 and/or further verify voltages 334-P can be applied to the second wordline until the erase operation is verified. If the third verify voltage 334-2 passes (e.g., verifies the erase operation), the second erase voltage can be equal to the sum of the first erase voltage and the product of the verify voltage increment value 333 multiplied by two since the two verify voltages 334-1 and 334-2 were applied to the second wordline. If a further verify voltage 334-P verified the first erase voltage, the second erase voltage could be equal to the sum of the first erase voltage and the product of the verify voltage increment value 333 multiplied by the number of verify voltages applied to the second wordline. The erase voltage step can be the verify voltage increment value 333 multiplied by the number of verify voltages applied to the second wordline.

Figure 4:
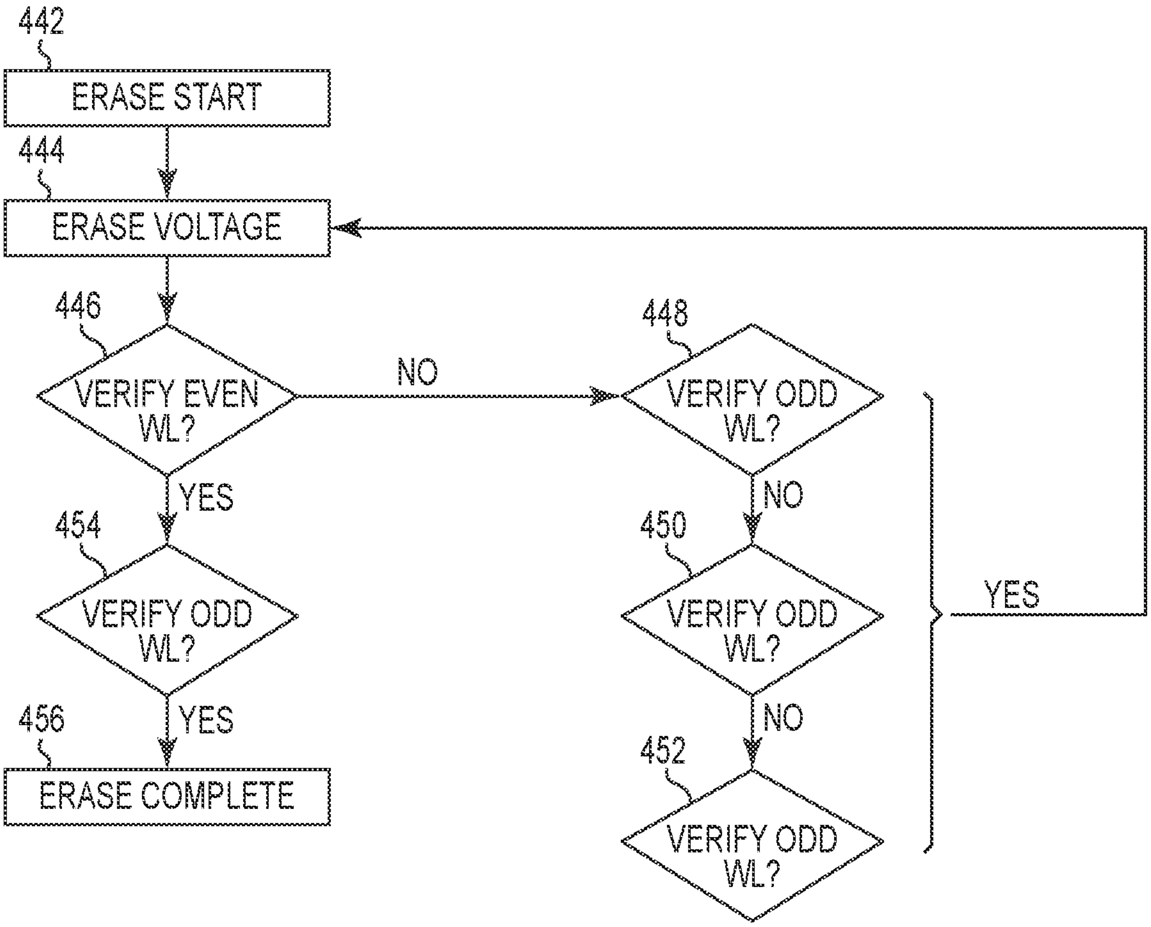
FIG. 4 is a flow diagram for verifying an erase operation in accordance with a number of embodiments of the present disclosure.

FIG. 4 is a flow diagram for verifying an erase operation in accordance with a number of embodiments of the present disclosure. At 442, the erase operation can start. An erase voltage can be applied to a first wordline and a second wordline at 444. An erase voltage is illustrated in FIG. 4, however the erase operation including an erase voltage is an example. The erase operation can utilize any means of erasing a wordline. For example, the erase operation can include an erase pulse and/or an erase current. Similarly, although illustrated as even and odd wordlines in FIG. 4, the erase operation can be verified starting with an odd wordline instead of an even wordline, for example.

At 446, a first verify voltage can be applied to an even wordline to verify the erase operation. If the erase operation fails to be verified by applying the first verify voltage to the first wordline at 446, a second verify voltage can be applied to an odd wordline at 448.

A second erase voltage can be applied at 444 if the erase operation is verified by applying the second verify voltage to the odd wordline at 448. The second erase voltage can equal the first erase voltage plus an erase voltage step. For example, the second erase voltage can equal a sum of the first erase voltage and a product of the verify voltage increment value multiplied by one, which is the number of verify voltages applied to the second wordline when the erase operation is verified by applying the second verify voltage to the second wordline.

Once the second erase voltage is applied at 444, the first verify voltage can be reapplied to the even wordline at 446. If the erase operation is verified by reapplying the first verify voltage to the even wordline, the first verify voltage can be applied to the odd wordline at 454. If the first verify voltage applied to the even wordline fails to verify the erase operation at 446, other erase voltages can be reapplied to the even and odd wordlines until the erase operation is verified. If the erase operation is verified by applying the first verify voltage to the odd wordline at 454, the erase operation can be complete at 456.

If applying the second verify voltage to the second wordline fails to verify the erase operation at 448, a third verify voltage can be applied to the second wordline at 450. If the third verify voltage fails to verify the erase operation, another verify voltage can be applied to the second wordline at 452 until the erase operation is verified. If the third verify voltage verifies the erase operation at 450, the second erase voltage can be equal to the sum of the first erase voltage and the product of the verify voltage increment value multiplied by two since two verify voltages were applied to the second wordline at 448 and at 450. If the erase operation was verified at 452, the second erase voltage could be equal to the sum of the first erase voltage and the product of the verify voltage increment value multiplied by three since three verify voltages were applied to the second wordline at 448, 450, and 452.

Figure 5A:
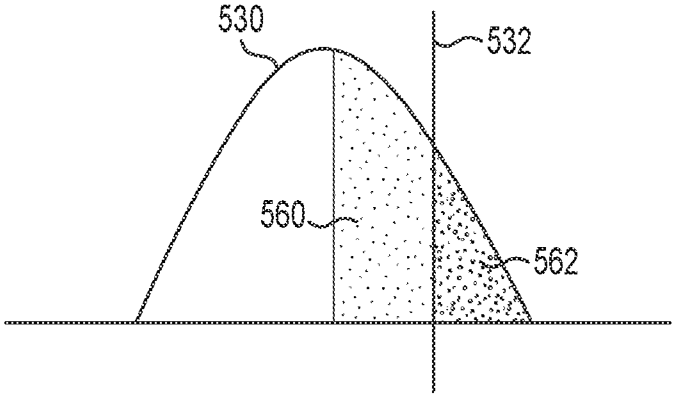
FIGS. 5A-5B are graphs of a threshold voltage distribution of an erased cell in accordance with a number of embodiments of the present disclosure.
Figure 5B:
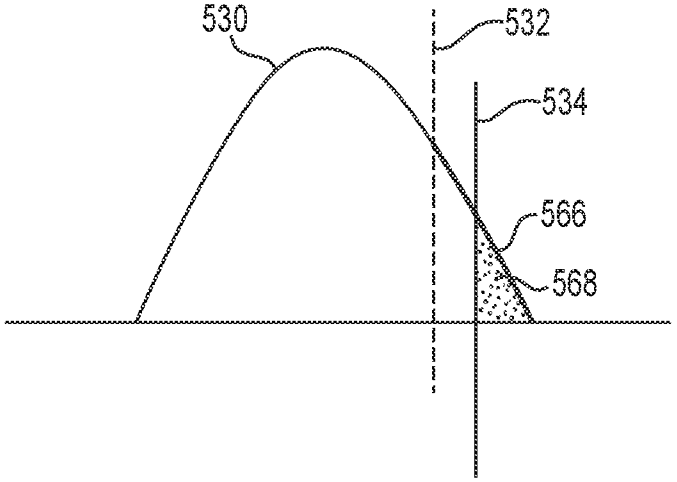

FIGS. 5A-5B are graphs of a threshold voltage distribution 530 of an erased cell in accordance with a number of embodiments of the present disclosure. The x-axis can be a voltage threshold and the y-axis can be a bit count.

After a first erase voltage is applied to a first wordline and a second wordline in an array of memory cells to perform an erase operation, a first verify voltage 532 can be applied to the first wordline to verify the erase operation. An erase operation can be verified in response to a failing bit count from applying the first verify voltage 532 being zero. To verify the erase operation, the failing bits, the bits having a threshold voltage higher than the first verify voltage 532, need to be located at half or less of a total number of bits. Accordingly, the first verify voltage 532 must fall within the areas of 560 or 562.

If the erase operation fails to be verified by applying the first verify voltage 532 to the first wordline, a second verify voltage 534 can be applied to the second wordline, as illustrated in FIG. 5B. The first wordline can be an even wordline and the second wordline can be an odd wordline or the first wordline can be an odd wordline and the second wordline can be an even wordline. Even and odd wordlines can have the same erase voltage distribution 530 post erase, accordingly, verify voltages applied to either wordlines can be shown on the same threshold voltage distribution 530 of an erased cell.

A bit count slope 566 can be determined based on a failing bit count shown in area 562 from applying the first verify voltage 532 and a failing bit count shown in area 568 from applying the second verify voltage 534. In some examples, a second erase voltage can be determined based on the bit count slope 566 by determining when the line of the bit count slope 566 will intersect with the x-axis, which is where the failing bit count is zero. The bit count slope 566 can be entered into a lookup table or a formula, which can be stored in an array of memory cells. The lookup table and/or formula can output a second erase voltage that corresponds with the bit count slope 566.

The second erase voltage can be applied to the first wordline and the second wordline in response to verifying the erase operation by applying the second verify voltage 534 to the second wordline. Once the second erase voltage is applied, the first verify voltage 532 can be reapplied to the first wordline. If the erase operation is verified by applying the first verify voltage 532 to the first wordline, the first verify voltage 532 can be applied to the second wordline. If the first verify voltage 532 applied to the first wordline fails to verify the erase operation, the second erase verify voltage 534 and/or other erase verify voltages greater than the first erase verify voltage 532 can be applied to the second wordline and can increase until the erase operation is verified. If the erase operation after the second erase voltage is applied is verified by applying the first verify voltage 532 to the second wordline, the erase operation can be complete.

Figure 6A:
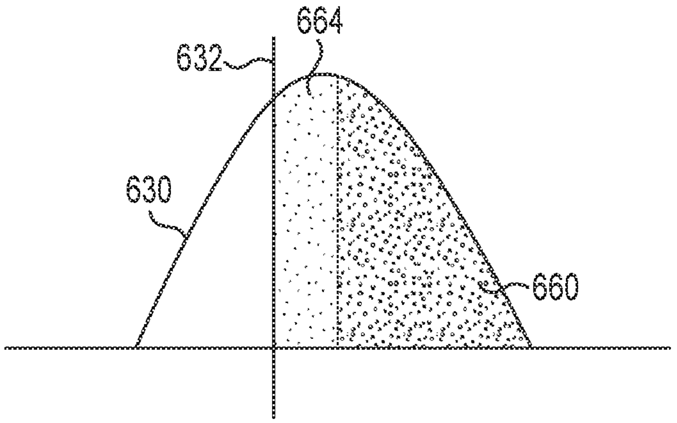
FIGS. 6A-6B are graphs of a threshold voltage distribution of an erased cell in accordance with a number of embodiments of the present disclosure.
Figure 6B:
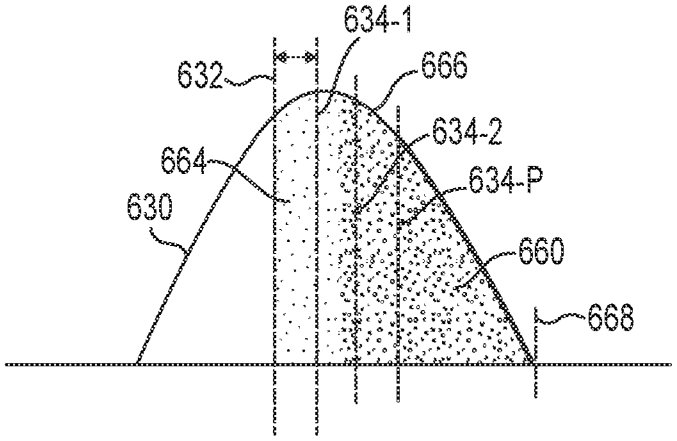

FIGS. 6A-6B are graphs of a threshold voltage distribution 630 of an erased cell in accordance with a number of embodiments of the present disclosure. The x-axis can be a voltage threshold and the y-axis can be a bit count.

After a first erase voltage is applied to a first wordline and a second wordline in an array of memory cells to perform an erase operation, a first verify voltage 632 can be applied to the first wordline to verify the erase operation. An erase operation can be verified in response to a failing bit count from applying the first verify voltage 632 being zero.

To determine a second erase voltage that results in a failing bit count of zero, failing bits, the bits having a threshold voltage higher than the first verify voltage 632 need to be located at half or less of a total number of bits in area 660. As illustrated in FIG. 6A, the first verify voltage 632 is located where the number of failing bits, in areas 660 and 664, are greater than half of the total number of bits. As such, a second verify voltage 634-1, greater than the first verify voltage 632, is applied to the second wordline. The second verify voltage 634-1 is located where the number of failing bits is greater than half of the total number of bits. Accordingly, a third verify voltage 634-2 is applied to the second wordline. The third verify voltage 634-2 is located at less than half the total number of failing bits in area 660. A fourth verify voltage 634-P is applied to the second wordline because two verify voltages with failing bit counts less than half of the total number of failing bits are needed to calculate a bit count slope 666.

The bit count slope 666 can be determined based on a failing bit count from applying the third verify voltage 634-2 and a failing bit count from applying the fourth verify voltage 634-P. In some examples, a second erase voltage can be determined based on the bit count slope 666 by determining when the line of the bit count slope 666 will intersect with the x-axis at 668, which is where the failing bit count is zero. The bit count slope 666 can be entered into a lookup table or a formula, which can be stored in an array of memory cells. The lookup table and/or formula can output a second erase voltage that corresponds with the bit count slope 666.

The second erase voltage can be applied to the first wordline and the second wordline in response to determining the second erase voltage. Once the second erase voltage is applied, the first verify voltage 632 can be reapplied to the first wordline. If the erase operation is verified by applying the first verify voltage 632 to the first wordline, the first verify voltage 632 can be applied to the second wordline. If the first verify voltage 632 applied to the first wordline fails to verify the erase operation, the second verify voltage 634-1 and/or other verify voltages 634-2, . . . , 634-P can be reapplied to the second wordline and/or other odd wordlines until the erase operation is verified. The second erase verify voltage 634-1 and/or other erase verify voltages 634-2, . . . , 634-P can be greater than the first erase verify voltage 632 and can increase until the erase operation is verified. The second erase voltage can be the first erase voltage plus a verify voltage increment value, for example. If the erase operation after the second erase voltage is applied is verified by applying the first verify voltage 632 to the second wordline, the erase operation can be complete.

Figure 7:
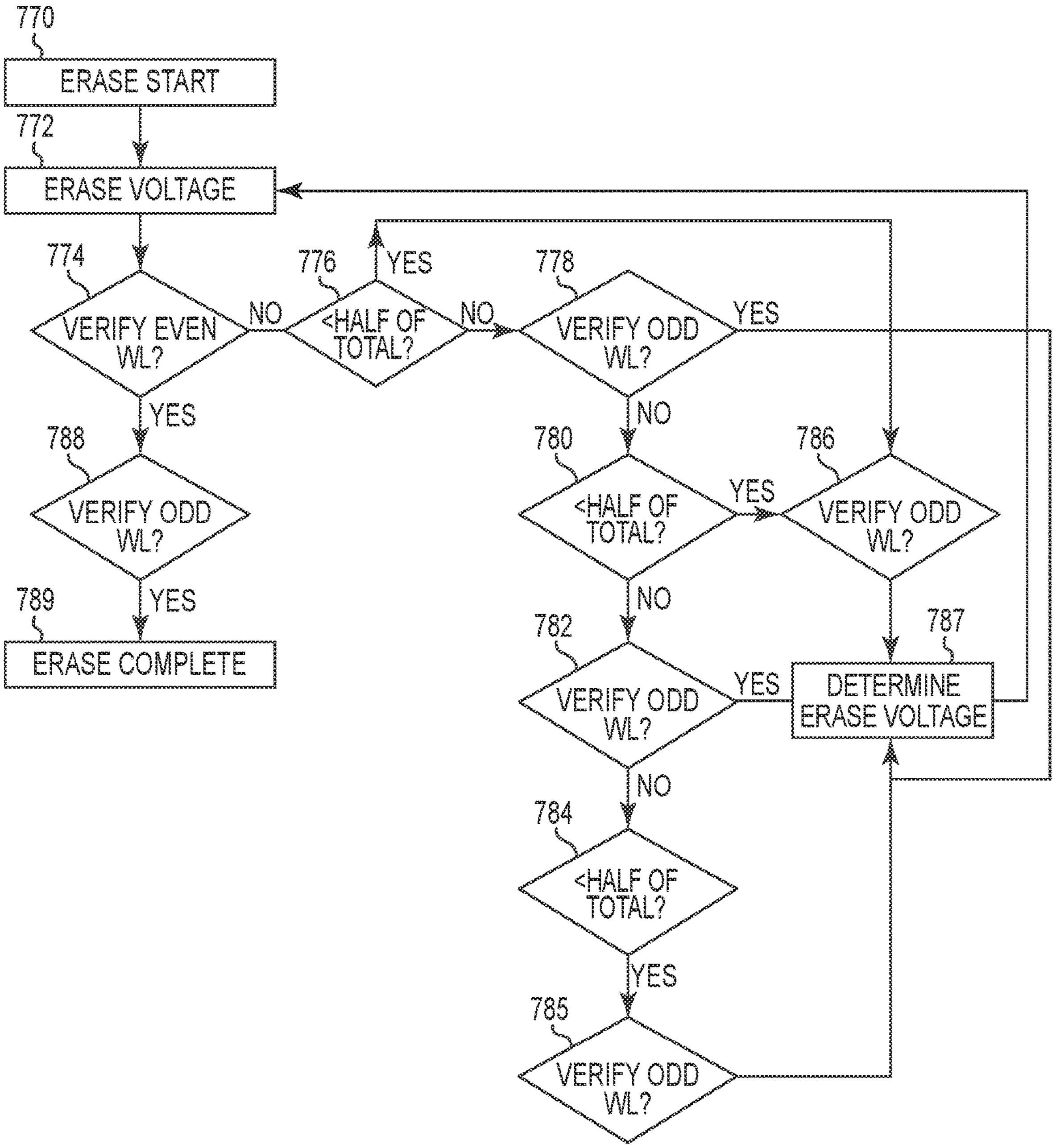
FIG. 7 is a flow diagram for verifying an erase operation in accordance with a number of embodiments of the present disclosure.

FIG. 7 is a flow diagram for verifying an erase operation in accordance with a number of embodiments of the present disclosure. At 770, the erase operation can start. An erase voltage can be applied to a first wordline and a second wordline at 772. An erase voltage is illustrated in FIG. 7 at 772, however the erase operation including applying an erase voltage is an example. The erase operation can utilize any means of erasing a wordline. For example, the erase operation can include an erase pulse and/or an erase current. Similarly, although illustrated as even and odd wordlines in FIG. 7, the erase operation can be verified starting with an odd wordline instead of an even wordline, for example.

At 774, a first verify voltage can be applied to an even wordline to verify the erase operation. If the erase operation fails to be verified by applying the first verify voltage to the first wordline at 774, at 776 it can be determined whether a failing bit count from applying the first verify voltage to the first wordline is greater than half of a total number of bits. To determine a second erase voltage that results in a failing bit count of zero, a verify voltage needs to be located at half or less of a total number of bits. If the failing bit count from applying the first verify voltage to the even wordline is equal to or less than half of the total number of bits, a second verify voltage can be applied to the odd wordline at 786 because two verify voltages equal to or less than half of the total number of bits are needed to determine a bit count slope.

If the failing bit count from applying the first verify voltage to the first wordline is greater than half of the total number of bits, a third verify voltage can be applied to the odd wordline at 778. If the erase operation fails to be verified by applying the third verify voltage to the second wordline at 778, at 780 it can be determined whether a failing bit count from applying the third verify voltage to the first wordline is greater than half of the total number of bits. If the failing bit count from applying the third verify voltage to the odd wordline is greater than half of the total number of bits, a fourth verify voltage can be applied to the odd wordline at 782.

If the erase operation fails to be verified by applying the fourth verify voltage to the second wordline at 782, at 784 it can be determined whether a failing bit count from applying the fourth verify voltage to the odd wordline is greater than half of the total number of bits. If the failing bit count from applying the fourth verify voltage to the odd wordline is equal to or less than half of the total number of bits, a fifth verify voltage can be applied to the odd wordline at 785 because two verify voltages equal to or less than half of the total number of bits are needed to determine a bit count slope.

In some examples, a second erase voltage can be determined at 787 based on the bit count slope. The bit count slope can be entered into a lookup table or a formula, which can be stored in an array of memory cells. The lookup table can include a number of bit count slopes that each correspond to an erase voltage. The lookup table and/or formula can output a second erase voltage that corresponds with the bit count slope.

The second erase voltage can be applied at 772 in response to determining the second erase voltage at 787. The second erase voltage can be applied to the even wordline and the odd wordline.

Once the second erase voltage is applied, the first verify voltage can be reapplied to the even wordline at 774. If the erase operation is verified by reapplying the first verify voltage to the even wordline, the first verify voltage can be applied to the odd wordline at 788. If the first verify voltage applied to the even wordline fails to verify the erase operation, the second verify voltage and/or other verify voltages, greater than the first erase verify voltage, can be applied to the odd wordline and can increase until the erase operation is verified. The second erase voltage can be the first erase voltage plus a verify voltage increment value, for example.

If the erase operation is verified by applying the first verify voltage to the odd wordline at 788, the erase operation can be complete at 789.

Figure 8:
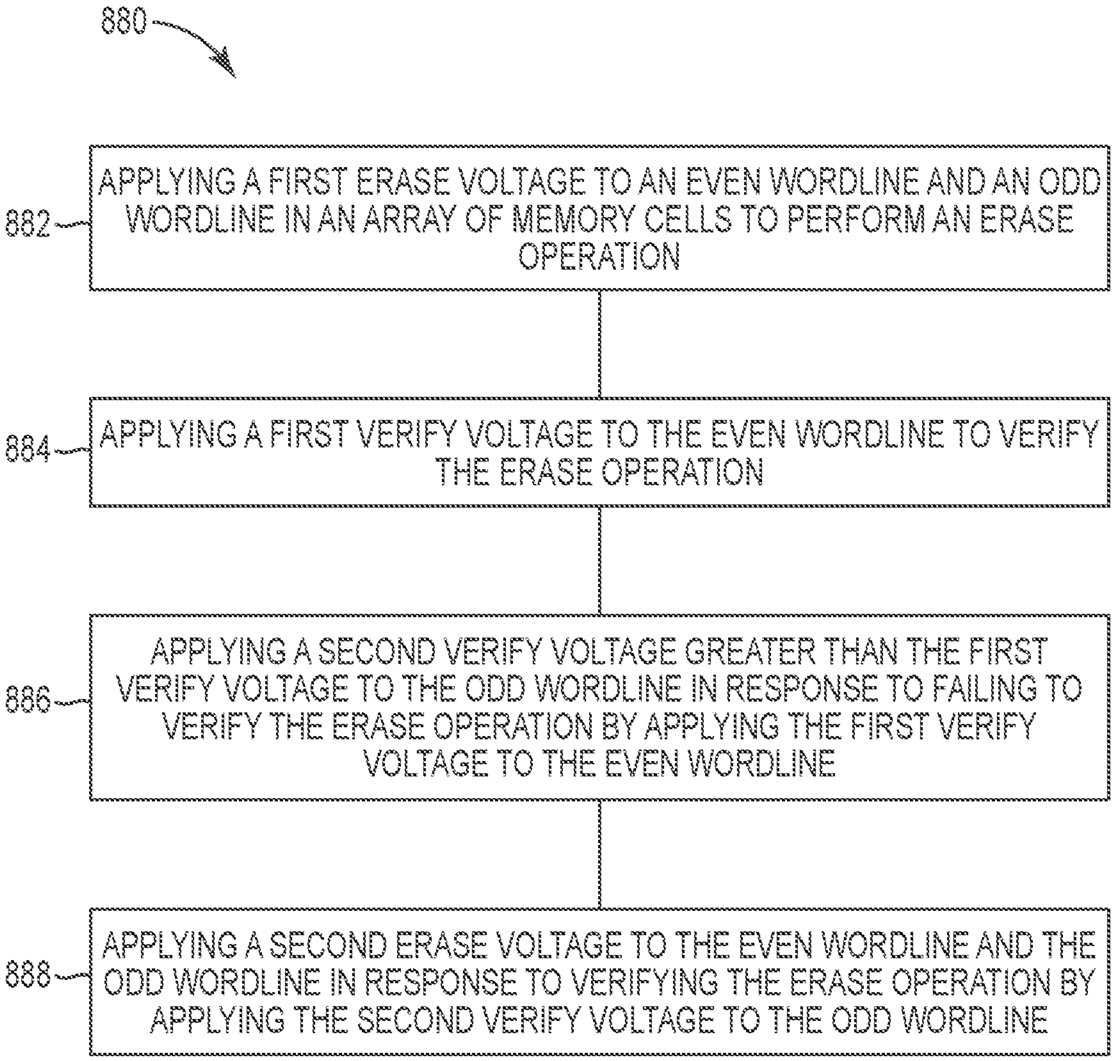
FIG. 8 is a flow diagram of a method for determining a dynamic erase voltage step in accordance with a number of embodiments of the present disclosure.

FIG. 8 is a flow diagram of a method 880 for determining a dynamic erase voltage in accordance with a number of embodiments of the present disclosure. At block 882, the method 880 can include applying a first erase voltage to an even wordline and an odd wordline in an array of memory cells to perform an erase operation.

At block 884, the method 880 can include applying a first verify voltage to the even wordline to verify the erase operation. The erase operation can be verified in response to a failing bit count from applying the first verify voltage being zero.

At block 886, the method 880 can include applying a second verify voltage greater than the first verify voltage to the odd wordline in response to failing to verify the erase operation by applying the first verify voltage to the even wordline. The erase operation can be verified in response to a failing bit count from applying the second verify voltage being zero.

At block 888, the method 880 can include applying a second erase voltage to the even wordline and the odd wordline in response to verifying the erase operation by applying the second verify voltage to the odd wordline. In some examples, the second erase voltage can be equal to the sum of the first erase voltage and a verify voltage increment value. The verify voltage increment value can be the difference between the first verify voltage and the second verify voltage.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:

an array of memory cells; and a controller coupled to the array of memory cells, wherein the controller is configured to:

apply a first erase voltage to a first wordline and a second wordline in the array of memory cells to perform an erase operation;

apply a first verify voltage to the first wordline to verify the erase operation;

apply a second verify voltage greater than the first verify voltage to the second wordline in response to failing to verify the erase operation by applying the first verify voltage to the first wordline; and apply a second erase voltage to the first wordline and the second wordline in response to verifying the erase operation by applying the second verify voltage to the second wordline, wherein the second erase voltage equals a sum of the first erase voltage and a verify voltage increment value, and wherein the verify voltage increment value is the second verify voltage subtracted from the first verify voltage.

2. The apparatus of claim 1, wherein the first wordline is an even wordline and the second wordline is an odd wordline.

3. The apparatus of claim 1, wherein the first wordline is an odd wordline and the second wordline is an even wordline.

4. The apparatus of claim 1, wherein the controller is configured to apply the first verify voltage to the second wordline in response to verifying the erase operation by applying the first verify voltage to the first wordline.

5. The apparatus of claim 4, wherein the controller is configured to complete the erase operation in response to verifying the erase operation by applying the first verify voltage to the second wordline.

6. The apparatus of claim 1, wherein the controller is configured to verify the erase operation in response to a failing bit count from applying the second verify voltage being zero.

7. A method, comprising:

applying a first erase voltage to an even wordline and an odd wordline in an array of memory cells to perform an erase operation;

applying a first verify voltage to the even wordline to verify the erase operation;

applying a second verify voltage greater than the first verify voltage to the odd wordline in response to failing to verify the erase operation by applying the first verify voltage to the even wordline; and applying a second erase voltage to the even wordline and the odd wordline in response to verifying the erase operation by applying the second verify voltage to the odd wordline, wherein the second erase voltage equals a sum of the first erase voltage and a verify voltage increment value, and wherein the verify voltage increment value is the second verify voltage subtracted from the first verify voltage.

8. The method of claim 7, further comprising applying a third verify voltage to the second wordline in response to a failing bit count from applying the first verify voltage being greater than half of a total number of bits.

9. The method of claim 8, further comprising applying a fourth verify voltage to the second wordline in response to a failing bit count from applying the third verify voltage to the second wordline being greater than half of the total number of bits.

10. The method of claim 8, further comprising determining a bit count slope based on a failing bit count from applying the third verify voltage and a failing bit count from applying the second verify voltage in response to the failing bit count from applying the third verify voltage being less than half of the total number of bits.

11. The method of claim 10, further comprising determining the second erase voltage based on the bit count slope.

12. The method of claim 11, further comprising applying the second erase voltage to the even wordline and the odd wordline in response to determining the second erase voltage based on the bit count slope.

13. The method of claim 7, further comprising reapplying the first verify voltage to the even wordline after applying the second erase voltage.

14. The method of claim 13, further comprising applying the first verify voltage to the odd wordline in response to verifying the erase operation by reapplying the first verify voltage to the even wordline.

15. The method of claim 14, further comprising completing the erase operation in response to verifying the erase operation by applying the first verify voltage to the odd wordline.

* * * * *